Feb. 20, 1968 W. H. VORIS 3,369,927
EXPANDABLE STYRENE POLYMERS BY TREATMENT WITH OZONE
Filed Nov. 26, 1965
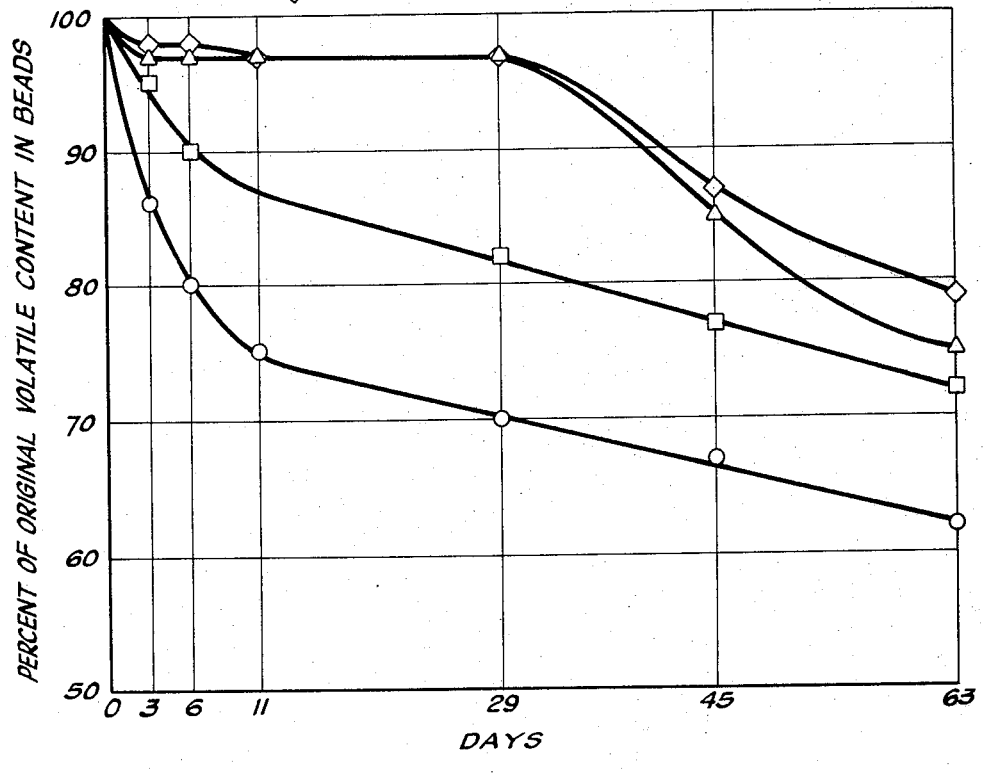
INVENTOR.
WILLIAM H. VORIS
BY David M. Bunnell
his Agent United States Patent Office 3,369,927
Patented Feb. 20, 1968

3,369,927
EXPANDABLE STYRENE POLYMERS BY TREATMENT WITH OZONE
William H. Voris, Mars, Pa., assignor to Koppers Company, Inc., a corporation of Delaware
Filed Nov. 26, 1965, Ser. No. 509,872
4 Claims. (Cl. 117—100)

ABSTRACT OF THE DISCLOSURE

A method for improving the properties of expandable styrene polymer particles and styrene polymer foams by treating the surface of the particles or the foam with ozone. The ozone treatment of the expandable particles prevents loss of blowing agent and prevents lumping during the pre-expansion of the particles without affecting the fusion of the particles on molding. Foam structures prepared from particles which have been treated with ozone prior to molding and foam structures which have their surfaces treated with ozone have sufficient solvent resistance that they can be coated with paints and resins having organic solvent vehicles which normally would attack and pit the foam surface.

---

This invention relates to a method for the improvement of the properties of expandable styrene polymer particles and styrene polymer foams by treatment of the surface of the particles or the foam molded therefrom.

Expandable styrene polymer particles or beads are commercially available under various names, for example under the trademark "Dylite." When such particles are heated to their softening point, the expanding or blowing agent volatilizes causing the particles to expand and fuse to form a cellular foam structure. These particles and the foamed structure resulting from the particles have a number of shortcomings that have restricted their use heretofore.

The blowing agent is a volatile compound, so the beads must be stored in an airtight container. Storage in the open atmosphere for a relatively short period of time permits the blowing agent to escape from the particles and the particles lose their expandability. Also, it is generally found desirable to pre-expand the individual particles, for example, by the process and apparatus described in Rodman Patent No. 3,023,175, to the desired bulk density of the finished article prior to placing the particles in the mold for the complete expansion and fusion operation. However, lumping tends to occur as a result of the premature fusion or agglomeration of individual particles. It is customary, therefore, to coat the particles with an anti-lumping agent prior to pre-expansion in an effort to overcome this tendency, but the incorporation of a sufficient amount of anti-lumping agent to prevent lumping during pre-expansion will result in poor fusion of the particles during the later molding operation.

Foam structures prepared from styrene polymer particles, particularly polystyrene beads have little or no solvent resistance and consequently the foamed structures are readily attacked by solvents. Thus, the foams cannot be coated with paints or other coatings which have an organic solvent base since a rough and pitted surface results.

A process has now been found for improving the properties of expandable styrene polymer particles with regard to shelf life, lumping, on pre-expansion, and solvent resistance. Furthermore, the solvent resistance of foam structures molded or extruded from the particles is also improved.

In accordance with this invention the expandable styrene polymer particles and styrene polymer foam structures are treated by ozonating the surface of the polymer by contacting the surface with a gas or aqueous solution containing ozone.

The surface treatment of the expandable styrene polymer particles is carried out either by forming an aqueous stirred suspension of the particles into which the ozone containing gas is introduced (i.e., wet treatment) or by placing the dry particles in a chamber or a fluidized bed to which is introduced the ozone containing gas. The foam structures are treated by placing them in a suitable chamber and introducing the ozone containing gas to the chamber.

The ozone containing gas may be produced in a conventional manner by passing a dry oxygen or air stream through an electric discharge. The amount of ozone in the gas stream generally ranges from about 0.03 to 5.0 mole percent of the gas stream. The rate of introduction of the ozone containing gas to the treating vessel is chosen from a standpoint of economics to obtain the maximum utilization of the ozone. Larger rates are employed as the amount of particles and the size of the treating vessel are increased. In any event, the rate is kept above a minimum where the treating time would become impracticably long. For example, using a recirculation system and a vessel of 2 liters capacity containing a bead charge of 500 grams a rate as low as .005 millimole/min. of ozone can be economically employed whereas in a 55 gallon vessel, without recirculation, containing a bead charge of about 65 kilograms of rate of 0.1 mole/min. of ozone is practical.

The treating time required will depend upon the feed rate of the ozone, the total surface area of the polymer particles to be treated, the size of the vessel employed, and the temperature. Generally the treatment time ranges between about 3 and 100 minutes per 5 square meters of surface area. Care must be taken to avoid excessive treatment of the particles which produces little additional improvement of the shelf life and lumping properties and has an adverse effect on the fusion properties of the beads.

The treatment temperature should be below the softening point of the polymer in order to avoid loss of the blowing agent from the particles and prevent expansion. Conveniently, temperatures between zero and 70° C. are employed and the treatment is carried out at substantially atmospheric pressure. It has been found that the rate of treatment of the particles in the aqueous media decreases with increasing temperature due to the lower solubility of the ozone in the aqueous medium.

Prior to treatment, the polymer particles should be free of extraneous materials on their surfaces which act as a barrier to the ozonation treatment. For example, when particles are prepared by the suspension polymerization process employing tricalcium phosphate as a suspending agent, it is necessary to wash the particles with aqueous acid and water in order to remove the suspending agent and obtain the desired benefits in the surface properties of the particles as heretofore described. And in fact, it has been found that where a wet treatment is employed it is preferred that the aqueous suspending media be acidified.

FIG. 1 is a graph illustrating the effect on the open storage life of expandable styrene polymer particles treated with ozone in aqueous suspension for various periods of time.

The invention is further illustrated by, but is not intended to be limited to, the following examples wherein "parts" are parts by weight unless otherwise indicated.

Example I

Expandable polystyrene beads were prepared by adding to a 100 gallon reactor equipped with a three-bladed impellor, in the following order with stirring, 100 parts of styrene, 0.33 part of a catalyst (consisting of 0.23 part of benzoyl peroxide and 0.10 part of t-butyl perbenzoate), 108 parts of water, 0.05 part of a suspending aid tetrasodium pyrophosphate, and 0.15 part of a suspending agent hydroxyethyl cellulose. The reactor was heated to 92° C. over 1½ hours and held at this temperature for 5 hours at the end of which time (about 70–75% conversion having resulted) an additional 0.05 part of hydroxyethyl cellulose was added and the addition was commenced of 9.5 parts of normal pentane. The pentane addition took 1½ hours. The temperature was maintained at 92° C. for an additional ½ hour. Then, the temperature was raised to 115° C. over a period of ½ hour and maintained at this temperature for 4 hours to complete the polymerization. The slurry was acidified with HCl to a pH of about 1.0. A portion of the slurry, aliquot A, was set aside and a second portion of the slurry, aliquot B, was centrifuged to remove the aqueous medium and recover the beads which were washed with water and air dried on trays.

Aliquot A was divided into a series of portions. One portion of aliquot A containing 107 grams of beads in water was placed in a 2 liter resin kettle equipped with a stirrer and water was added to bring the total volume of water to 1 liter. The resin kettle was equipped with a fritted glass gas inlet tube, a thermometer, and a gas outlet tube leading to a trap containing a potassium iodide solution. Stirring was commenced with the slurry being maintained at room temperature (27° C.) and a stream of oxygen containing 3% ozone (provided by a Welsbach T–23 Ozonator, a conventional ozone generator which produces ozone containing gas streams by passing dry oxygen or air through an electric discharge) was bubbled through the stirred bead-water slurry at a rate of about 0.6 cubic feet per minute (0.002 mole of ozone per minute) for ten minutes. After the ten minutes the oxygen-ozone stream was discontinued and nitrogen was bubbled through the slurry until the effluent gas gave a negative test for active oxygen with starch-iodide test paper. The beads were filtered off and air dried at room temperature. The above procedure was repeated with other portions of aliquot A except that the ozonation time was increased to 20 and 30 minutes respectively.

Ten gram quantities of each portion of the expandable polystyrene beads which had been ozonated by the above procedure for 10, 20 and 30 minutes were placed in separate 8 ounce glass ointment jars and a 10 gram portion of the beads of aliquot B was also placed in an 8 ounce glass ointment jar as a control. The mouths of the jars were covered with a two-ply layer of tissue paper held in place by a rubber band. The jars were stored on a shelf at room temperature for a total of 63 days. Periodically, 1 gram samples of the beads were accurately weighed in an aluminum weighing dish on an analytical balance and then heated for 2 hours in an oven at 150° C. After the beads had been cooled to room temperature in a desiccator the weighing dish and contents were reweighed on the balance. The percent weight loss was calculated and reported as the percent volatile content of the bead sample as shown in Table I below. The percent of the original volatile content remaining in the beads was then calculated and a plot of the results, FIG. 1, shows that the open storage life of the expandable beads was greatly increased by the ozonation treatment with the portions of beads having been treated for at least 20 minutes maintaining their volatile content at 97% or more even after 30 days of open storage.

TABLE I

| Experiment No. | Ozonation Rate, mm/. min. | Treatment Time, Minutes | Open Storage Life, percent by weight volatiles—Days | | | | | | |
|---|---|---|---|---|---|---|---|---|---|
| | | | 0 | 3 | 6 | 11 | 29 | 45 | 63 |
| Control | | 0 | 6.4 | 5.5 | 5.1 | 4.8 | 4.5 | 4.3 | 4.0 |
| I–1 | 2 | 10 | 6.0 | 5.7 | 5.4 | 5.6 | 4.9 | 4.6 | 4.3 |
| I–2 | 2 | 20 | 6.1 | 5.9 | 5.9 | 5.9 | 5.9 | 5.2 | 4.6 |
| I–3 | 2 | 30 | 6.2 | 6.1 | 6.1 | 6.0 | 6.0 | 5.4 | 4.9 |

*Example II*

A 500 gram portion of the beads of aliquot B were reslurried in 450 grams of distilled water in a 2 liter resin kettle equipped with a stirrer, a fritted glass gas inlet tube, a thermometer, and a gas outlet tube leading to a trap containing an aqueous potassium iodide solution. A stream of air containing 2% ozone provided by the Welsbach T–23 Ozonator was bubbled through the stirred bead-water slurry, which was maintained at a temperature of 27° C., at a rate of 0.002 mole of ozone per minute, for 10 minutes after which the air-ozone stream was discontinued and nitrogen was bubbled through the slurry until the effluent gas gave a negative test for active oxygen with starch-iodide test paper. The beads were filtered off and air dried at room temperature. The above experiments were repeated with fresh portions of the beads of aliquot B with ozonation times of 20, 30 and 60 minutes respectively.

The open storage test was conducted on 10 gram quantities of beads derived from each experiment above and the percent volatile content loss determined periodically as in Example I. The test was conducted for a period of 45 days. The results are shown in Table II below.

TABLE II

| Equipment No. | Ozonation Rate, mm./minute | Treatment Time, minutes | Open Storage Life, Percent by weight volatiles—Days | | | | Percent by weight volatiles remaining after 45 days |
|---|---|---|---|---|---|---|---|
| | | | 0 | 7 | 14 | 45 | |
| II–1 | 2 | 10 | 5.7 | 4.4 | 3.7 | 2.8 | 49 |
| II–2 | 2 | 20 | 6.3 | 5.7 | 5.2 | 4.3 | 68 |
| II–3 | 2 | 30 | 6.4 | 5.6 | 5.2 | 6.7 | 73 |
| II–4 | 2 | 60 | 6.5 | 6.1 | 5.8 | 5.2 | 80 |

It can be seen from the results that the sample which was ozonated for 40 minutes retained 80% of the volatile content even after 45 days with the retention of blowing agent increasing with increasing ozonation time.

*Example III*

A 650 gram portion of the beads of aliquot B of Example I were placed in a stainless steel cylinder, 15 inches long by 2½ inches inner diameter. The cylinder was equipped with a sintered steel sparger at the bottom and a gas outlet tube at the top of the column which led to a trap containing a potassium iodide solution. A stream of oxygen containing 5% ozone, provided by a Welsbach T–23 Ozonator, was passed into the cylinder at a temperature of 25° C. through the sintered steel sparger at a rate of 0.004 mole of ozone per minute. After a 10 minute period the ozone-oxygen stream was discontinued and nitrogen passed into the cylinder until the effluent gas gave a negative test for active oxygen with starch-iodide paper.

The above experiments were repeated with fresh portions of beads with ozonation times of 20, 30 and 60 minutes. The volatile content after 32 days of open storage was determined for each portion of ozonated beads along with a control sample which had not been ozonated. The results are shown in Table III below.

A lumping test was conducted on each portion of untreated and treated beads by placing 4 gram quantities of beads in a cylindrical screen cage (4 inches high by 3.5 inches in diameter) along with two No. 2 rubber stopper tumblers. To pre-expand the beads, the cage was rotated for three minutes at 60 r.p.m. in a closed container which contained boiling water. The expanded beads were recovered from the screen cage and allowed to air dry in paper containers for approximately 18 hours. The aged expanded beads were screened through a No. 3½ inch mesh U.S. standard sieve and the percent lumping determined from the weight of the beads which were retained on the screen. The results of the tests are listed in Table IV.

To determine fusability of the treated beads pre-expanded as above in Example III, the beads were placed in an 8 inch diameter by 4 inches cylindrical steam mold surrounded by a steam chest. Steam at 20 p.s.i.g. was passed into the beads for 17 seconds in order to cause the beads to expand and fuse together and fill the mold cavity. As shown by the results in Table III the bead-to-bead fusion was not adversely affected by the ozonation treatment.

TABLE III

| Experiment No. | Ozonation Time, minutes | Percent by Weight Volatile Content after 30 Days | Lumps, Percent by Weight | Molding Bead to Bead Fusion |
|---|---|---|---|---|
| Control | 0 | 67 | 60 | Very good. |
| III-1 | 10 | 91 | 7 | Do. |
| III-2 | 20 | 94 | 0 | Do. |
| III-3 | 30 | 95 | 0 | Do. |
| III-4 | 60 | 95 | 0 | Good. |

*Example IV*

Portions of the slurry of aliquot A (500 grams of beads in approximately 500 grams of water) were ozonated according to the procedure of Example I for 10, 20, 30 and 60 minutes. The beads which were recovered from the ozonation slurries were air dried, pre-expanded by subjecting them to steam at atmospheric pressure for 3 minutes and then molded in an 8 inch diameter by 4 inch cylindrical steam mold using the molding conditions indicated in Table IV. The results with regard to bead-to-bead fusion and density are listed in Table IV. It can be seen that the bead-to-bead fusion was still good for the portion of the beads which had been ozonated for 30 minutes. Some effect on fusion was noticeable with the portion of the beads which had been ozonated for 60 minutes indicating that excessive ozonation times should be avoided since they are not necessary to give sufficient improvement with regard to open storage and lumping properties and may adversely affect the molding properties. It should also be noted that the effect of the ozone treatment is to lower the density of the resulting foam, i.e., increasing the expandability. This is believed to be due not only to better retention of blowing agent prior to molding but also due to the fact that the ozonated surface of the beads tends to hold in the volatilized blowing agent during expansion so that the pressure of the expanding agent within the beads is maintained at a high level for a longer period of time than with untreated beads.

TABLE IV

| Experiment No. | Molding Conditions, 8″D x 4″ Steam Mold | | | | Evaluation | |
|---|---|---|---|---|---|---|
| | Cook Time, sec. | Cool Time, min. | Steam, p.s.i.g. | Header, p.s.i.g. | Fusion | Density, lb./ft.³ |
| Control | 15 | 5 | 20 | 30 | Very Good | 1.30 |
| IV-1 | 20 | 4 | 20 | 30 | do | 1.20 |
| IV-2 | 18 | 4 | 20 | 30 | do | 1.18 |
| IV-3 | 17 | 3.5 | 20 | 30 | Good | 1.10 |
| IV-4 | 17 | 3 | 20 | 30 | Poor | 1.06 |

*Example V*

In order to demonstrate the effect of temperature on the ozonation, portions of aliquot A of Example I were ozonated for 10 minutes using the procedure of Example I except for the temperature variations which are shown in Table V. The lumping and molding characteristics were determined by the procedure described in Example III with the results shown in Table V below. It can be seen that the fusion of the beads on molding was not adversely affected and the improvement in lumping properties was not greatly affected by the ozonation temperature. Portions of aliquot A were then ozonated for 30 minutes and the molding characteristics were determined. It can be seen from Table V that the fusion was less affected at the higher treating temperature which is due to a slower ozonation process resulting from the lower solubility of the ozone in the aqueous medium at the higher temperatures.

TABLE V

| Experiment No. | Temperature, °C. | Treatment Time, minutes | Lumps, Percent by | Bead-to-Bead Fusion |
|---|---|---|---|---|
| Control | | | 32 | Good. |
| V-1 | 0 | 10 | 10 | Do. |
| V-2 | 27 | 10 | 0 | Do. |
| V-3 | 40 | 10 | 4 | Do. |
| V-4 | 70 | 10 | 0 | Do. |
| V-5 | 0 | 30 | 0 | Fair. |
| V-6 | 27 | 30 | 4 | Do. |
| V-7 | 40 | 30 | 2 | Good. |
| V-8 | 70 | 30 | 4 | Do. |

*Example VI*

A 500 gram portion of the beads of aliquot B were screened to determine the bead size distribution which is shown in Table VI.

TABLE VI

Screen opening microns: Weight percent Retained
2000 _____ .2
1190 _____ 2.2
840 _____ 29.6
590 _____ 42.7
420 _____ 18.5
297 _____ 4.5
250 _____ .95
210 _____ .50
177 _____ .35
149 _____ .50

From the bead size distribution the surface area per gram was computed to be 94.91 square cm. per gram. The beads were then reslurried in 450 grams of distilled water in a 2 liter resin kettle equipped with a stirrer, a fritted glass gas inlet tube, a thermometer, and a gas outlet tube leading to a trap containing an aqueous potassium iodide solution. A stream of air containing 2 percent ozone provided by the Welsbach T-23 Ozonator was bubbled through the stirred bead-water slurry at a rate of 0.002 mole of ozone per minute at a temperature of 25° C. The ozonation was continued until substantially no more ozone was being consumed by reaction with the beads as determined by measuring the ozone content of the effluent gas (about 20 minutes). At the end of 20 minutes the total amount of ozone which had reacted with the beads was 0.156 gram or .00325 mole. Based on the total bead surface area of 94.91×500=47455 cm.$^2$ or 4.7455 square meters the ozone consumption in millimoles per square meter was 3.25/4.7455 or about .69 mmole/meter$^2$.

*Example VII*

A 600 gram portion of the dry polystyrene beads of aliquot B prepared in Example I were placed in a stainless steel cylinder 15 inches long and 2 inches in diameter equipped with a sintered sparger at the bottom and a gas outlet tube leading to a trap containing potassium iodide solution. A stream of air containing 0.03 percent ozone provided by Welsbach T-23 Ozonator was passed into the cylinder for a period of 100 minutes. Ten gram portions of the beads were aged in open storage for 32 days. At the end of the 32 days the volatile content was determined. The volatile content had decreased to 92 percent of the original content indicating a loss of only 8 percent volatile during the period.

*Example VIII*

The foam cylinder produced in Example IV from the beads which had been ozonated for 20 minutes at room temperature was coated with a polyester resin formulation consisting of 100 parts of polyester resin (Koplac 2109-10 Koppers Company, Inc.), 0.1 part paraffin wax, 0.1 part cobalt napthenate, and 3,4 parts of 60% methyl ethyl ketone peroxide. The cylinder molded from the control beads which had not been ozonated in Example IV was also coated with the same polyester resin formulation. The cylinder molded from the ozonated beads showed no adverse effects by any solvent attack of the polyester coating formulation and a smooth, glossy coating was produced. In contrast, the cylinder molded from the untreated beads became uneven and pitted when coated with the polyester resin formulation due to the attack of the solvent vehicle on the foam structure. The enhanced solvent resistance of the treated foam is a result of the surface of the polymers being cross linked by the ozone treatment.

*Example IX*

A portion of Dylite SR-4 beads (expandable styrene-acrylonitrile copolymer beads, 70/30 by weight styrene/acrylonitrile Koppers Company, Inc.) were pre-expanded to a bulk density of 1.3 lbs/ft.$^3$ over steam and placed in a cubical mold having 3 inch sides. Steam was injected into the mold to cause expansion and fusion of the beads forming a 3 inch cube of styrene acrylonitrile copolymer foam. The cube was cut in such a manner as to have two uncut molded surfaces, three hot wire cut surfaces, and one sawed surface. The cube was then half covered with aluminum foil, the borders of which were taped fast to the block so that one-half of each kind of surface could be exposed to an ozone-oxygen mixture while the other half was shielded by the foil. The cube was then suspended in a 2 liter resin kettle and an ozone-oxygen stream introduced through a fritted glass sparger placed beneath the cube at a rate of 0.06 cu. ft./min. (0.002 mole of ozone per minute) for 30 minutes. Both the exposed and unexposed surfaces were then coated by a paint roller with a polyester resin formulation consisting of:

100 parts polyester resin (low reactivity resilient isophthalic resin Koplac 2109-10 Koppers Company, Inc.)
.01 part paraffin wax
.01 part 6% cobalt napthenate
3.4 parts 60% methyl ethyl ketone peroxide The coated sample was allowed to cure overnight before making the following observations recorded in Table VII.

TABLE VII

| Coated Surface | Unozonated (Shielded) | Ozonated |
|---|---|---|
| Molded | Shrunken, eroded, rough. | Smooth, no damage. |
| Sawed | Shrunken, badly eroded, rough. | No damage. |
| Hot wire | Shrunken, badly eroded, rough. | Slight shrinkage, some areas. |

By styrene polymer is meant polymers prepared by polymerizing either alone or in admixture such vinyl aryl monomers as styrene, α-methylstyrene, nuclear halogenated styrene, dimethylstyrenes, vinylnaphthalene, divinylbenzene, etc. The term styrene polymers also includes copolymers of the above vinyl aryl monomers with minor amounts of vinyl monomers such as acrylonitrile, vinyl chloride, allyl esters of organic acids, tung oil, etc.

The foregoing has described a novel process improving the characteristics of expandable polystyrene polymers and the foamed structures derived therefrom. Lumping during pre-expansion is eliminated and the particles are capable of retaining their expandability for long periods of time even on open storage. Treatment of the particles before molding or treatment of the surface of the molded foam structure provides a foam surface having sufficient solvent resistance so that it can be coated with compositions having an organic solvent vehicle.

I claim:
1. A process for improving the characteristics of particles of a expandable styrene polymer composition containing a volatile organic blowing agent which comprises ozonating the surface of said polymer particles by contacting said surface with a gas containing ozone.
2. The process of claim 1 in which said particles are treated with said ozone, while in suspension in an aqueous medium, by continuously introducing said ozone into said aqueous medium.
3. The process of claim 2 in which the suspending medium is acidified.
4. The process of claim 1 in which said styrene polymer particles are polystyrene.

References Cited

UNITED STATES PATENTS

| 3,086,885 | 4/1963 | Jahn. |
| 3,088,925 | 5/1963 | Hall. |
| 3,300,437 | 1/1967 | Ferrigno. |

MURRAY TILLMAN, *Primary Examiner.*

M. FOELAK, *Assistant Examiner.*